(No Model.)
J. R. HOLMES.
INEXTINGUISHABLE LAMP FOR MARINE AND LAND PURPOSES.
No. 311,583. Patented Feb. 3, 1885.
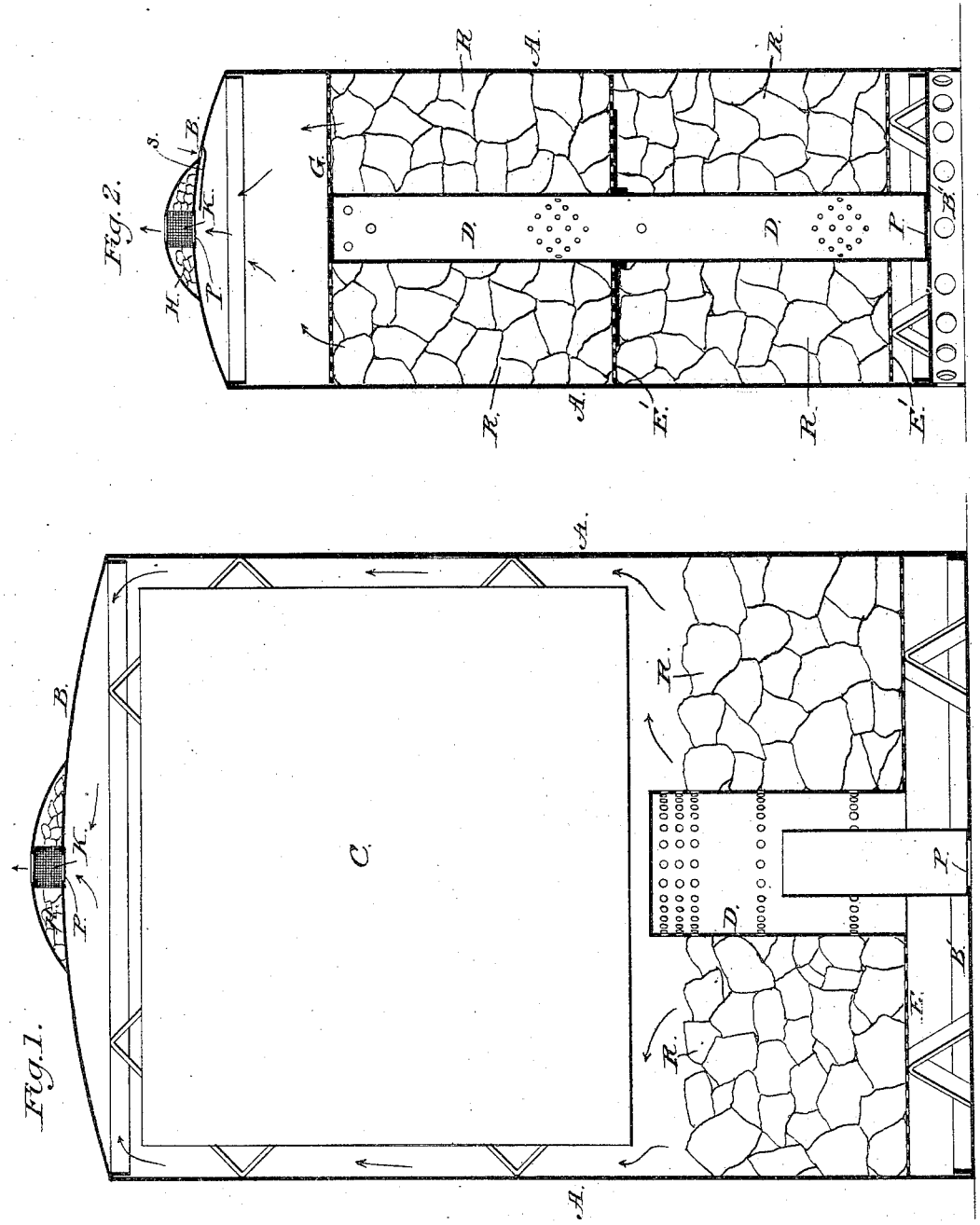

UNITED STATES PATENT OFFICE.

JOSEPH R. HOLMES, OF LONDON, COUNTY OF MIDDLESEX, ENGLAND.

INEXTINGUISHABLE LAMP FOR MARINE AND LAND PURPOSES.

SPECIFICATION forming part of Letters Patent No. 311,583, dated February 3, 1885.

Application filed November 15, 1884. (No model.) Patented in England February 18, 1884, No. 3,490.

*To all whom it may concern:*

Be it known that I, JOSEPH ROBERT HOLMES, of London, in the county of Middlesex, England, have invented a new and useful Improvement in Inextinguishable Lights for Marine and Land Purposes, for which I obtained a patent in England February 18, 1884, No. 3,490; and I do hereby declare that the following is a full and exact description thereof, reference being had to the accompanying drawings, and to the letters of reference marked thereon, making a part of this specification.

This invention relates to the generation of phosphureted-hydrogen gas for use as an inextinguishable light; and it consists in an improved construction, as herein described, of a lamp for generating spontaneously-inflammable phosphureted-hydrogen gas or phosphide of calcium, and for combining the same automatically with an excess of chemically-prepared oxygen gas, and by means whereof the refuse of the phosphide of calcium is separated or filtered from the mass of chemical still evolving the gas, the apparatus being designed for use either on sea or land, in any form, or with any suitable auxiliary mechanical contrivances.

In the accompanying drawings, Figure 1 is a vertical central section of my improved inextinguishable lamp constructed with a float; Fig. 2, a similar section of a modification thereof in which the float is omitted.

A represents a closed cylinder or vessel, of wood or of tin or other metal, to contain the chemicals for producing gas in the presence of water or other liquid. This vessel is closed and hermetically sealed by means of a detachable cover or cap, B B′, at each end thereof, each cap or cover having one or more apertures in the center or side thereof, which are closed by soft-metal plugs or plates P P, which admit of being removed at will, or of being readily punctured, so as to allow a free ingress or inflow of water or liquid at one end of the receptacle and the egress or outlet of the generated gas or gases at the other.

Within the closed cylinder or receptacle A is fitted an air-tight cell or chamber, C, (see Fig. 1,) either fixed or movable, and which is of suitable size and capacity to impart to the receptacle A the degree of buoyancy required to float it. An open space is provided between the air-chamber C and the inclosing-cylinder A, or suitable channels are otherwise provided to allow the generated phosphureted-hydrogen gas to pass freely from end to end of the cylinder, and find a free outlet at its upper end, B, when an opening is produced therein. The sealed hole or holes in the lower cover, B′, of the cylinder or receptacle A are covered by an internal tube or cone, D, perforated to produce, in manner as required, a distribution of the water or liquid admitted to the cylinder through said hole or holes when opened. An encircling perforated disk or screen, E, is attached to the tube or cone D, at a regulated distance from the base B′, to uphold the chemicals placed in the cylinder A and permit the decomposed matter separating therefrom during the generation of the spontaneously-inflammable gas to drop through and away from the decomposing mass, thereby leaving the latter free and clean for continued exposure to the exciting-liquid. Where the cylinder or receptacle A does not require an air or flotation chamber, C, I divide the entire space in the cylinder between the top and bottom thereof into a series of separate compartments by means of one or more perforated disks or screens, E′ E′, (see Fig. 2,) each adapted to uphold a certain portion of the gas-generating material, and I carry the water-supply tube or cone D up through the same, so as to bring, as required, the whole charge into such immediate contact with the inflowing water or liquid as may be required to regulate the quantity and the time of evolving the inflammable gases. I provide, also, a perforated disk, G, to be placed upon the upper charge of chemicals to confine the same. An independent chamber, H, is formed on the top of the upper end or cover, B, of the cylinder A. A perforated or wire-gauze tube, K, which is plugged and sealed at both ends, but in such manner as to admit of being readily opened when required, is secured centrally in this chamber H over the opening thereinto from the cylinder or receptacle A, so as to form a conduit from said receptacle A through the chamber H to the outer air.

In preparing the apparatus for use, phosphuret or phosphide of calcium, R, is placed upon each of the perforated disks or diaphragms E or E′ within the cylinder about the perforated tube D, so as to fill the space above the supporting-disk, and having thus charged the cylinder or receptacle A with the phosphide of calcium, its ends are closed by the appropriate caps or covers, B B', and hermetically sealed. The chamber H in the upper cover, B, of the cylinder A is in like manner charged with a chemical compound for producing oxygen, (such as mercuric oxide, manganese oxide, potassium chlorate, bleaching-powder, used singly or combined, or with other oxygen compounds,) and which will evolve the gas when exposed to the heat of the passing flame of phosphureted-hydrogen gas, the compound being placed around the perforated tube K, so that the oxygen generated in the chamber H may escape and combine with the outflowing hydrogen from the chamber A when the apparatus is in use, to produce a greater intensity and brilliancy of flame or light than is obtained from the phosphureted-hydrogen gas alone.

When required for use the sealed apertures in the caps or covers B B' are opened in any suitable manner, and the cylinder A immersed in water or other liquid, which, entering the perforated tube D, will flow through it into contact with the phosphide of calcium upon the perforated supporting disks or screens. The decomposition of the phosphide of calcium by contact with the water will generate freely phosphureted-hydrogen gas, which, spontaneously igniting, will flow out through the upper end of the tube K and the opening in the upper end of the case, and burn with a brilliant flame. The outflowing hydrogen, passing through the tube K in the chamber H on the upper end of the cylinder, will heat said chamber and cause a generation of oxygen gas therein, which, combining with the phosphureted-hydrogen gas will intensify the brilliancy of the flame. As the phosphide of calcium is gradually decomposed, the waste matter therefrom is permitted to drop away through the interstices of the supporting disks or screens into the lower chamber of the cylinder A.

In connection with the chemical contents of the apparatus I may combine therewith such other chemical ingredients as will change the color of the ordinary flame of the phosphureted-hydrogen gas or the time of its generation as desired for any given purpose. I contemplate also forming or inserting between the base or bottom of the upper or oxygen chamber, H, and the top or cover of the receptacle A, containing the phosphide of calcium, one or more air-passages, S, Fig. 2, to cause an independent air-current to assist in the mixing of the generating gases.

Having now particularly described and ascertained the nature of my said invention and in what manner the same is to be performed, I declare that what I claim is—

1. The combination, in an inextinguishable lamp, with a chamber for containing phosphuret or phosphide of calcium and a tube therein for the distribution of the inflowing water admitted thereto, of one or more perforated disks or screens encircling the tube as a support for the chemicals, and by means whereof the spent matter is allowed to separate from the phosphide of calcium, as hereinbefore described.

2. The combination, with the gas-generating chamber in an inextinguishable lamp, and with its eduction-openings, of an independent chamber to contain ingredients for the generation of oxygen gas and for coloring the flame, and a perforated tube or conduit in said oxygen-chamber, to conduct the phosphureted-hydrogen gas through the same, substantially as and for the purpose herein set forth.

In testimony whereof I have signed my name to this specification in the presence of two subscribing witnesses.

JOSEPH R. HOLMES.

Witnesses:
   JAMES HENRY SPEIRS,
      Clerk, Cross Arthudie, Barrhead.
   JOHN A. MCCALLUM,
      Coal-Master, 12 Waterloo St., Glasgow.